March 31, 1959  H. F. FAUGHT  2,879,936
ELASTIC FLUID APPARATUS
Filed Dec. 16, 1955
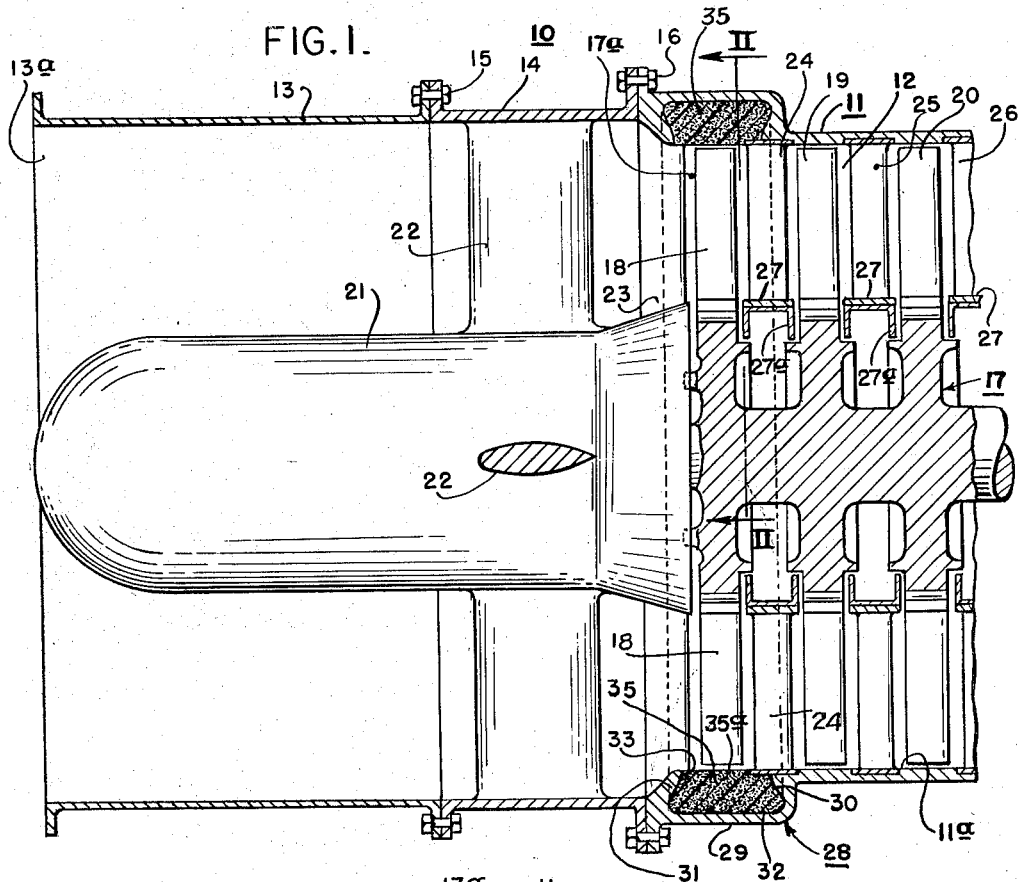
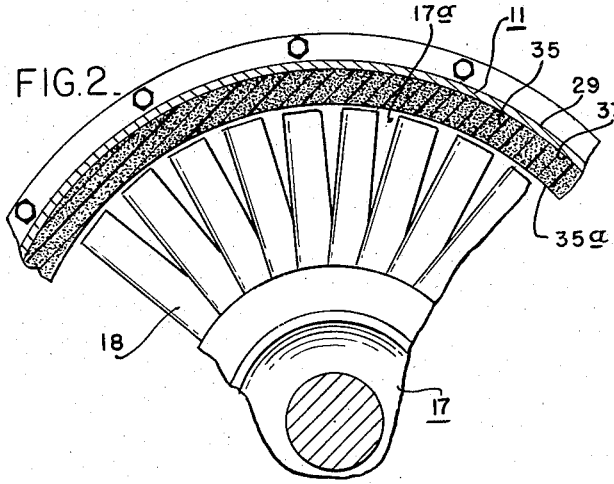
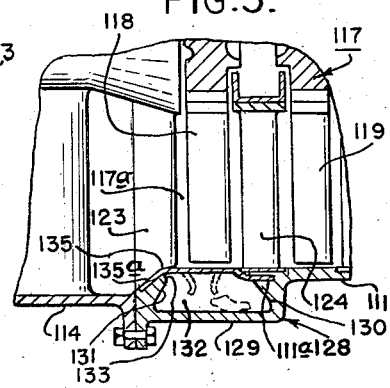
INVENTOR
HAROLD F. FAUGHT
BY Frank Cusimano Jr.
AGENT

United States Patent Office 2,879,936
Patented Mar. 31, 1959

2,879,936

ELASTIC FLUID APPARATUS

Harold F. Faught, Westwood, Kans., assignor to Westinghouse Electric Corporation, East Pittsburgh, Pa., a corporation of Pennsylvania Application December 16, 1955, Serial No. 553,622

1 Claim. (Cl. 230—132)

This invention relates to elastic fluid utilizing apparatus of the axial flow type, more particularly to axial flow compressors employed in aviation gas turbine engines, and has for an object to provide a trap for capturing foreign solid particles entrained in the air intake before serious damage is incurred by the engine.

Another object is to provide a debris trap for apparatus of the above type which imposes a minimum penalty on the efficiency of the apparatus.

A further object is to provide a debris trap which is simple and inexpensive to manufacture and is readily installed and serviced.

One of the currently common hazards encountered in aviation gas turbine operation is the entry of foreign objects into the compressor air intake occasioned by entrainment in the air stream. These objects include a wide assortment of debris such as nuts, bolts, stones or odd pieces of metal. To avoid immediate blade failure by impingement of such foreign objects on the compressor blades, the stator blades are usually shrouded and the rotor blades are made of steel or other durable materials. Even with such rugged construction an expensive overhaul is necessary after virtually every foreign object encounter, since extensive blade damage is usually incurred.

Since, during passage through the compressor blading, the foreign object is generally thrown against the outer casing by the rotor blades, the invention provides an arrangement wherein damage in the majority of cases may be limited to the first stage of the compressor.

In accordance with the invention, an annular chamber or debris trap is provided in the compressor casing in substantially radial alignment with and encompassing the first blade row of the rotor. The debris trap is preferably of greater width, in axial direction than the rotor blades and a readily penetrable annular member is provided which extends across the trap and has a smooth surface portion conforming to the inner surface of the casing, so that the air stream flowing therepast is unimpeded. The readily penetrable member may assume a number of forms.

In the first embodiment, the member is an annular mass of porous foam plastic imbedded in the trap and substantially filling the same. As debris thrown by the rotor blades strikes the plastic member it becomes imbedded therein and thus can do no further damage.

In the second embodiment, the member is formed of relatively thin sheet material forming a closure or shield for the trap. As debris strikes the sheet material shield, it punctures the material and drops into the trap, thereafter being held by the shield against reentering the air stream.

If desired, additional debris traps may be provided at succeeding stages to catch foreign objects which may conceivably get past the debris trap in the first stage.

These and other objects are effected by the invention as will be apparent from the following description and claim taken in connection with the accompanying drawing, forming a part of this application, in which:

Fig. 1 is a fragmentary axial sectional view of the air intake portion of a gas turbine engine incorporating the invention;

Fig. 2 is a fragmentary cross-sectional view taken on line II—II of Fig. 1; and

Fig. 3 is a fragmentary sectional view illustrating another embodiment of the invention.

Referring to Fig. 1 of the drawing, there is illustrated the air intake end of a gas turbine engine 10 having an outer cylindrical housing 11 within which are disposed an axial flow compressor 12 and the usual fuel combustion apparatus and turbine apparatus (not shown).

An air intake duct comprising cylindrical casing portions 13 and 14 are attached to each other and to the housing 11 in any desired manner, for example, by annular series of bolts 15 and 16, respectively.

The compressor 12 has a rotor 17, defining with the engine housing 11, an annular, axially extending air passageway 17a, and is provided with a plurality of unshrouded annular rows of radially extending blades including first, second and third stage blade rows 18, 19 and 20, respectively. As is well known in the art, the rotor 17 is rotatably supported at its forward end in a centrally disposed fairing member 21 which in turn is supported in the air intake casing portion 14 by a plurality of radial struts 22.

Within the engine housing 11 there are provided a plurality of annular rows of stationary vanes or blades including a row of inlet guide vanes 23 disposed upstream of the first rotor blade row 18, and first, second and third stage turning vane rows 24, 25 and 26, respectively, interposed between the rotor blade rows 19, 20 etc., as is well known in the art. The stationary vane rows 24–26 inclusive, may be attached at their outer ends to the engine housing 11 in any suitable manner, and may be provided at their inner ends with suitable shroud rings 27 and seal rings 27a.

In accordance with the invention, the engine housing 11 is provided with an annular, radially outwardly offset portion 28 having an outer central cylindrical wall portion 29 and adjoining, opposed side wall portions 30 and 31, defining an annular chamber 32. The chamber 32 encompasses at least the first rotor blade row 18 and has an annular opening 33 communicating with the air passageway 17a in the region extending from the inlet guide vanes 23 to the first stage stationary vane row 24.

As shown in Figs. 1 and 2, an annular member 35 made of plastic material is imbedded in the chamber 32. The specific type of material employed is not limited; however, it must be readily penetrable under the impact of flying solid particles, as will subsequently be explained. For example, a suitable material is porous plastic foam. The plastic member 35 substantially fills the chamber 32 and is provided with a smooth cylindrical surface 35a blending with the inner surface 11a of the engine casing to provide a smooth air flow passage to the air stream flowing through the compressor passageway 17a. The plastic member may be retained in the chamber 32 in any desired manner; however in the illustrated embodiment the side walls 30 and 31 are formed with a slight convergence in the direction toward the chamber opening 33 to key the plastic member in position.

In operation, as the compressor rotor 17 rotates at high speed, air is drawn through the air intake opening 13a into the annular air passageway 17a of the compressor where it is subjected to the well known progressive compression action of the spinning rotor blade rows 18, 19 and 20 and the stationary vane rows 23–26 inclusive. In the event that a solid foreign element is sucked into the air intake and entrained in the air stream, it will move along an axial path until it is struck by one or more of the blades in the first rotor blade row 18. The effect of the collision between the foreign element and the blading deflects the foreign element from its axial course and throws it in a radially outward direction against the plastic member 35 with sufficient force to penetrate and imbed itself in the plastic member. Thus the foreign element is quickly removed from the air stream flowing through the compressor before it can cause any damage to the following blades. Also, even through the first rotor blade row 18 may incur some damage, this damage is reduced to a minimum, since ricochet of the foreign element is reduced to a minimum.

In Fig. 3 there is shown another embodiment of the invention illustrating the forward portion of a gas turbine engine housing 111 having an air intake casing portion 114 attached thereto in a manner similar to that shown in the first embodiment. Within the engine housing 111 there are provided a plurality of annular rows of stationary vanes including a row of inlet guide vanes 123 and a row of first stage turning vanes 124. The compressor rotor 117 is provided with a plurality of annular rows of blades including first and second stage rows 118 and 119, respectively.

The engine housing is provided with an annular, radially outwardly offset portion 128 having an outer cylindrical wall portion 129 and opposed side wall portions 130 and 131 defining an annular chamber 132. The chamber 132 encompasses the first rotor blade row 118 and has an annular opening 133 communicating with the annular air passageway 117a defined by the compressor rotor 117 and the engine housing 111. The annular opening 133 is blocked by an imperforate cylindrical sheet material shield 135 which may be retained in position in any desired manner. For example, the engine housing may be provided with a circular groove 111a to receive the rear marginal portion of the shield while the forward marginal portion 135a may assume a conical shape to abut the side wall 131 of the chamber. Also, the shield 135 is provided with a smooth air flow surface to permit unimpeded flow of the air stream therepast. The shield is made of relatively thin metal or other suitable material which may be readily penetrated by a rapidly moving solid foreign element.

In operation, as air is drawn through the air intake member 114 into the annular passageway 117a of the compressor, should a solid foreign element be entrained in the air stream it will be deflected radially outwardly upon collision with the first rotor blade row 118. The thus deflected foreign element will strike the shield 135 with sufficient momentum to penetrate the latter and drop into the chamber 132, where it is trapped and prevented from doing further damage.

It will now be seen that the invention provides a relatively inexpensive arrangement for minimizing damage to an axial flow, elastic fluid utilizing machine heretofore caused by foreign elements entrained in the elastic fluid.

It will further be noted that the invention provides a readily penetrable member for trapping foreign solid elements in the above described manner which member may be easily replaced after a serious encounter with such solid elements.

Furthermore, the penetrating characteristics of the plastic member 35 in the first embodiment or the sheet material shield 135 are not critical and may be selected in accordance with the degree of protection required. For example, if the machine is sufficiently rugged to endure very small foreign elements, the penetrating characteristics of the member 35 or shield 135 may be chosen to prevent penetration by any except larger foreign elements.

Although in the embodiments illustrated, only the first stage of the compressor has been provided with the improved debris trap, additional debris traps may be provided for one or more succeeding stages for additional protection, if desired.

While the invention has been shown in several forms, it will be obvious to those skilled in the art that it is not so limited, but is susceptible of various other changes and modifications without departing from the spirit thereof.

What is claimed is:

In an axial flow elastic fluid utilizing machine, a rotor having an annular row of unshrouded blades, a housing having an annular row of stationary blades disposed in cooperative relation with said row of rotor blades, said housing and said rotor jointly defining an axially extending annular fluid flow passage, said housing having an annular chamber encompassing said row of rotor blades, said chamber communicating with and extending radially outwardly of said fluid flow passage, whereby to receive solid elements thrown radially outwardly by said row of rotor blades, and an annular member formed of plastic porous foam material readily penetrable by solid elements and substantially filling said chamber, said annular member having a radially inwardly disposed surface portion presenting a smooth fluid flow surface to fluid flowing through said fluid flow passage.

References Cited in the file of this patent

UNITED STATES PATENTS

| 1,679,519 | Frey | Aug. 7, 1928 |
| 2,494,328 | Bloomberg | Jan. 10, 1950 |
| 2,720,356 | Erwin | Oct. 11, 1955 |
| 2,802,618 | Prachar | Aug. 13, 1957 |

FOREIGN PATENTS

| 39,729 | Netherlands | Dec. 15, 1936 |
| 307,762 | Great Britain | Dec. 12, 1929 |
| 461,600 | Great Britain | Feb. 19, 1937 |
| 518,145 | Great Britain | Feb. 19, 1940 |
| 619,722 | Great Britain | Mar. 14, 1949 |